Figure 1:
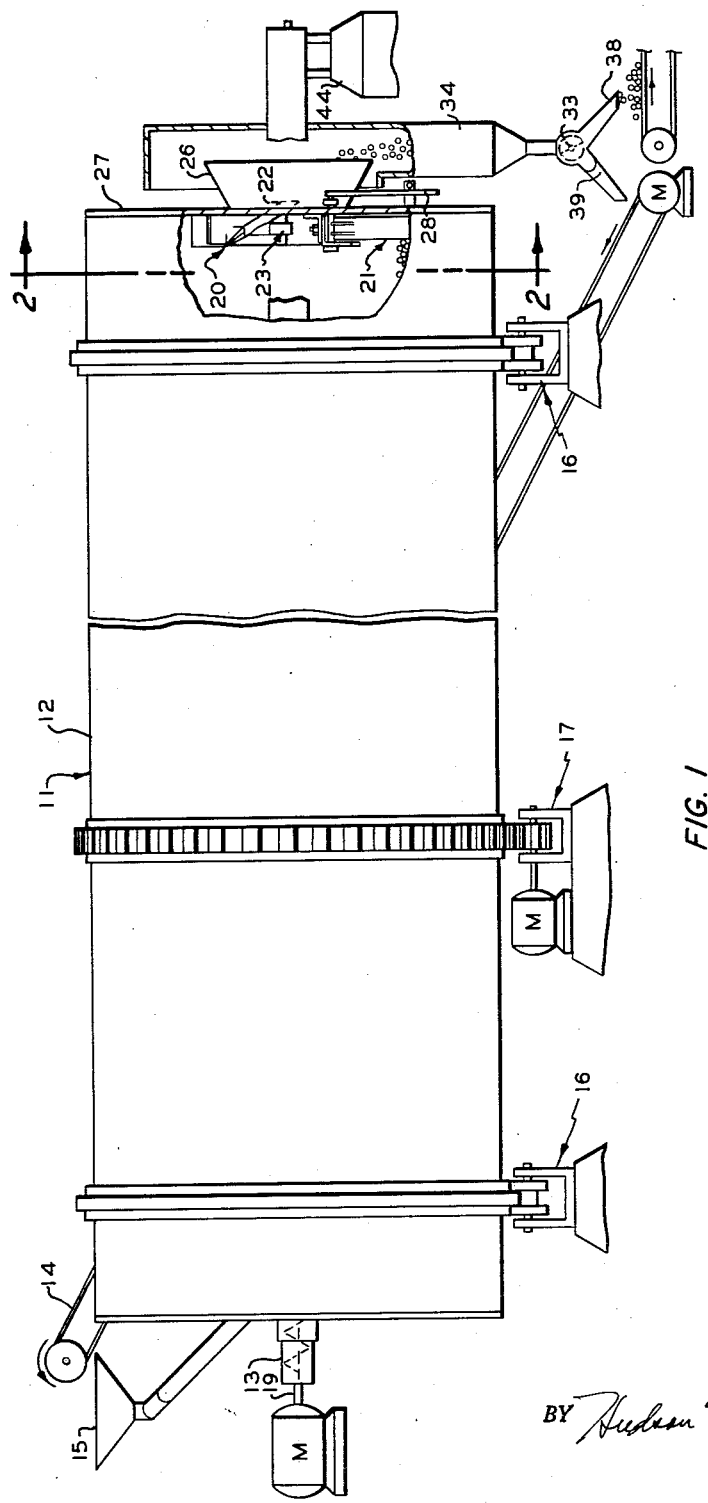

Aug. 8, 1961  L. R. EADES  2,994,912
CARBON BLACK PELLET MILL
Filed Aug. 14, 1959  2 Sheets-Sheet 2

INVENTOR.
L. R. EADES
BY
ATTORNEYS

United States Patent Office 2,994,912
Patented Aug. 8, 1961

2,994,912
CARBON BLACK PELLET MILL
Lawrence R. Eades, Borger, Tex., assignor to Phillips Petroleum Company, a corporation of Delaware
Filed Aug. 14, 1959, Ser. No. 833,787
6 Claims. (Cl. 18—1)

This invention relates to pelleting of carbon black. In one aspect it relates to an apparatus for conversion of light, flocculent carbon black as produced into free-flowing, relatively dustless, small aggregates or pellets.

The carbon black industry has for many years produced carbon black by incomplete combustion of a hydrocarbon, such as natural gas, gas oils, viscous asphaltic crude oils and the like. Carbon black as initially produced is an extremely light, fluffy, and finely divided material weighing ordinarily from about 3 to 4 pounds per cubic foot. This extremely light and fluffy material is very difficult and dusty to handle. In order to conserve shipping space, to make easier to handle and to reduce the dustiness of the black, the loose or flocculent black is ordinarily pelleted by tumbling in a horizontally positioned, rotating, cylindrical drum, called a pellet mill. The pellets, when properly formed, compacted and hardened, weigh in the neighborhood of 24 pounds per cubic foot. Such pellets are quite easy to handle, are relatively dustless and markedly conserve shipping space in comparison to the original flocculent black. The pelleting operation comprises, in general, forming of nuclei of carbon black, adding of layers of flocculent carbon black to the nuclei and compacting these layers of black by rolling and tumbling during the rotation of the mill. The fully formed and compacted and relatively dense pellets are discharged from the outlet end of the mill.

While pellet mills used throughout the industry do a very acceptable job of pelleting the flocculent black, increased throughputs of pelleting equipment are always desired. When attempting to increase the throughput of a pellet mill of a given diameter and length, an increased bed depth is usually necessary. When pelleting many carbon blacks, an increased bed depth in the mill beyond a certain maximum depth results in the breaking up of the pellets and nuclei already formed and the re-forming of flocculent, loose black. The rotational speed of a mill greater than a maximum also causes breaking up of the pellets. Once a bed of pellets has been broken up with the production of loose, flocculent black, this so-formed, loose black is extremely difficult to repellet, that is, it is much more difficult to pellet than the original, flocculent black. Since this broken up black is extremely difficult to repellet, common practice is to remove the black from the mill and start the pellet mill again with a new supply of the original, loose, flocculent black. After a bed of pellets has been produced with the new charge of black, then the broken-up, flocculent black can be repelleted by adding a few percent of this previously-pelleted black to the regular charge to the pellet mill.

While the actual production of pellets from ordinary, flocculent carbon black is not an especially difficult operation, the compacting of the so-formed pellets without overtreatment, in many instances, is a tedious operation. As mentioned hereinabove, the maintenance of a maximum bed depth without exceeding the maximum is one requirement for the production of the best pellets. Also, to produce good pellets with a maximum of mill throughput, the maximum bed depth should be maintained as nearly as possible throughout the length of the mill.

In an attempt to maintain a uniform bed depth throughout the length of the mill, past practice has provided dippers for removing the pelleted product from the surface of the bed at the discharge end of the mill. These dippers are mounted on the inside end wall of the discharge end of the mill and extend through the wall. At the lower portion of their path of travel the dippers or scoops pick up carbon pellets and discharge them at about the highest point of their travel. Since pellet mill feed tubes or supports therefor extend throughout the entire length of the mill and beyond both ends, these conventional dippers discharge their loads of pellets at about the highest point of dipper travel. The pellets fall downward and impinge against the aforementioned tube extending beyond the end wall at the discharge end of the mill. The falling of the carbon black pellets against this tube tends to break an appreciable percentage of the pellets with the formation of an undesired amount of fines. According to this invention, pellet scoops are provided with directional chutes for directing the flow of pellets as they are discharged from the scoops so that they will not drop against the above-mentioned support tubing. In this manner the depth of pellet bed is maintained relatively constant throughout the length of the mill, pellets are removed from the top of the bed at the discharge end of the mill and the pellets so removed are not broken on their passage from the mill.

The conventional dippers are mounted so that the axis of the scoops and discharge ends are positioned along radii of the end wall of the mill, and by reason of this arrangement falling pellets are directed against the feed and support tube. These scoops also discharge pellets at the high point of the mill rotation. This discharge not only subjects the pellets to an unnecessarily high drop but also causes them, as mentioned above, to drop directly over the feed tube or support member. These conditions combine to contribute to pellet breakage which results in dusting in the area and a higher fines content in the final product. The fines content is critical because it is one of the specifications upon which customers base acceptance of the product.

Another embodiment of this invention involves provision of a separate pellet scoop assembly for use at the discharge end of the pellet mill at such a time that it is desired to empty the mill of its load of pellets so that maintenance personnel need not be required to empty the mill manually of its load of pellets.

An object of this invention is to provide pellet removal apparatus for use with pellet mills in which the pellets are removed without substantial breakage thereof. Another object of this invention is to provide such pellet removal apparatus which is simple and relatively inexpensive to construct, install and to maintain. Another object of this invention is to provide a pellet-removal means for use in case it is ever desired to empty the mill of pellets. Still other objects and advantages of this invention will be realized upon reading the following description which, taken with the attached drawing, forms a part of this specification.

Pellet mills such as those described in U.S. Patents 2,503,361 and 2,883,274 are suitable with which to use the pellet scoops of this invention.

Figures 2, 3, 4:
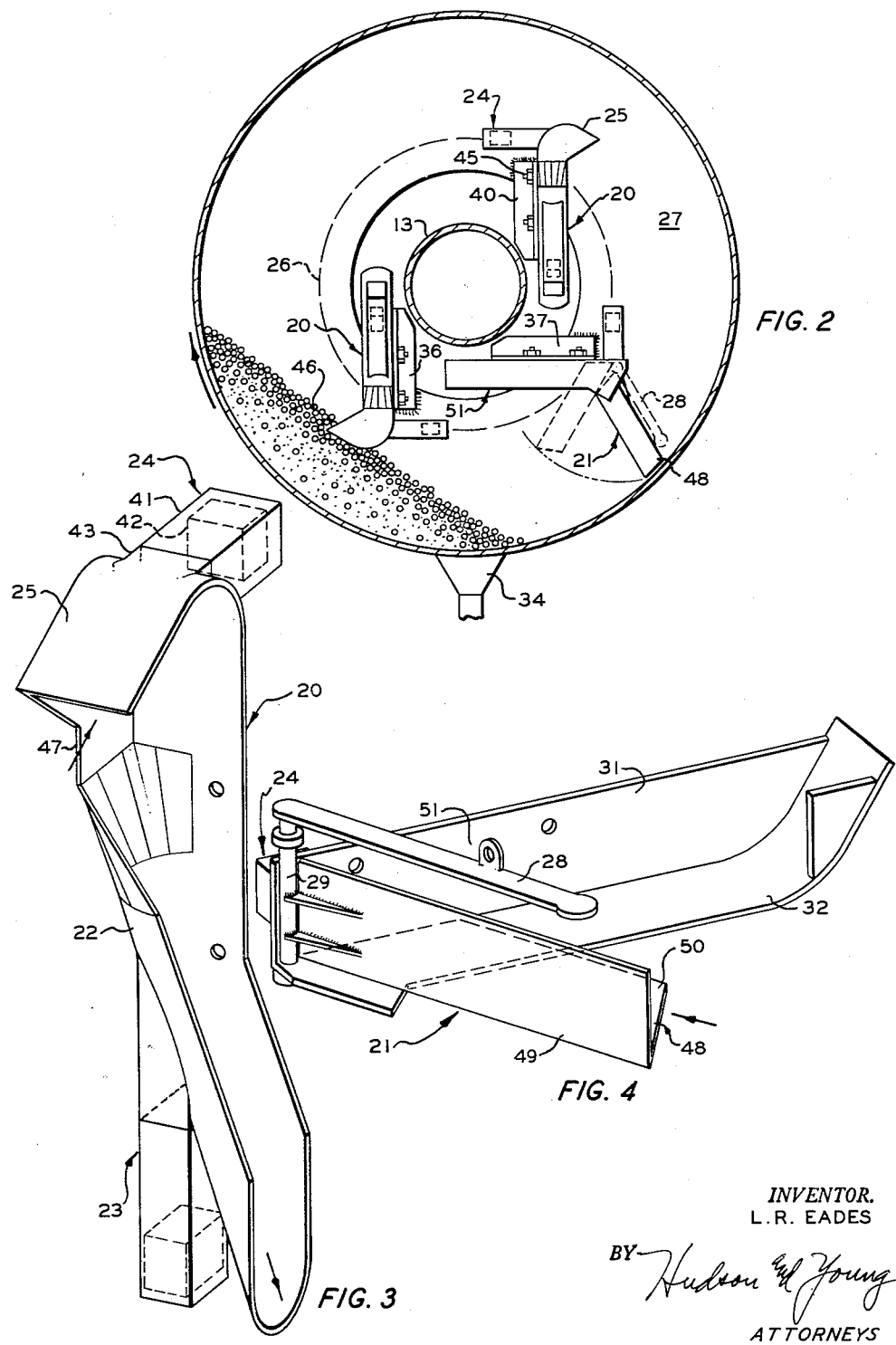

In the drawing,
FIGURE 1 is a longitudinal view, partly in section, of a pellet mill employing the apparatus of this invention.
FIGURE 2 is a sectional view taken on the line 2—2 of FIGURE 1.
FIGURE 3 is an elevational view of one embodiment of pellet scoop of this invention, in perspective.
FIGURE 4 is a view, in perspective, of another embodiment of pellet scoop of this invention.

In the drawing, reference numeral 11 identifies, broadly, a carbon black pellet mill of generally cylindrical form. Such a mill is composed of an elongated shell 12 which is rotatably supported on roller support assemblies 16. These roller support assemblies can, if desired, be metal wheels in contact with a metal, circular member or rim extending around the pellet mill. However, frequently the roller support assemblies include inflated tires mounted on wheels similar to automobile wheels upon which the pellet mill rests. A suitable means for rotating the mill is a motor driven gear assembly identified by reference numeral 17.

In FIGURE 1 a feed tube 13 enters the inlet end of the mill and extends throughout its entire length and beyond the discharge end of the mill, the portion of the tube extending beyond the discharge end of the mill being supported by a support member 44. Disposed within tube 13 is a shaft 19 which supports a helical screw, now shown, for transfer of feed carbon black, from a source not shown, through tube 13 into the mill. Along the bottom of tube 13, at predetermined points within the mill, are provided openings for passage of the feed black from the tube 13 into the operational portion of the mill. Positioning of these openings along the bottom of the feed tube is described in the above-mentioned Patent 2,503,361. Pellets removed from the discharge end of the mill flow downward in a hopper 34 to a damper-type divider 33, the regulation of which divides the carbon black into two streams, one being withdrawn through a chute 38 as product of the process while the remainder passes through chute 39 to be returned by a belt 14 to a feed hopper 15 as recycle.

The pellet product removal scoop or dipper assemblies of this invention are identified by reference numeral 20 and a drain dipper assembly of this invention is identified by reference numeral 21. The dipper or scoop assemblies 20 are illustrated in FIGURES 2 and 3. In FIGURE 2 the pellet mill is intended to rotate clockwise, as indicated by the directional arrow, and the scoops 20 are attached by riveting, welding or by bolts 45 to an angle iron 36, which, in turn, is attached to the discharge end wall 27 by welding or other suitable means. With the pellet mill rotating in a clockwise direction, the pellet bed 46 therein assumes the position illustrated in FIGURE 2. Since the scoop assemblies 20 are rigidly attached to the end wall of the pellet mill, they rotate and as one scoop reaches the position illustrated in FIGURE 2 it fills with carbon black. The pellets then remain in the scoop until such time as the scoop approaches a high point of its travel at which time the pellets roll gently downward through a chute 22. On referring to FIGURE 1, as the dipper assembly near the top of its path of travel, the pellets flow downwardly through chute 22 and are discharged from the pellet mill outward beyond flange 26 and they fall downward into the hopper 34. Flange 26 is provided for the purpose of making certain that pellets do not fall downward between hopper 34 and the end wall 27 of the mill. The general shape of the scoop portion 25 of the scoop assembly is illustrated in FIGURES 2 and 3 and this is the portion that actually picks up the carbon black from the bed of pellets. The side of the scoop facing the upstream end of the pellet mill has a side wall 47 which prevents pellets from falling from the scoop back to the bed of pellets. This wall and the bottom plate of the dipper terminate as the metal chute 22 begins and this chute 22 then changes the direction of the flow of pellets as the scoop assembly approaches the top of its path of travel.

It will be noted that the dipper assemblies are so positioned and oriented that, as a scoopful of pellets flows through the chute, they flow downward beyond one side of the feed tube 13. In this manner the pellets do not fall against this tube to cause breakage, as above mentioned.

By positioning the scoop assemblies 20 as herein disclosed, the dippers discharge their load of pellets at a point approximately 270° from the point of pickup. The pellets also roll gently down the chute 22 with the rotation of the mill at a lower elevation and to one side of the centrally positioned tube 13. This reduces pellet breakage, thereby improving the product and reducing dusting.

As is well known in the art of handling carbon black, flocculent carbon black is very sticky and tends to adhere to metal surfaces. Even though the carbon black has been pelleted, metal surfaces with which the black comes in contact frequently become coated with a layer of carbon black and, in order to prevent adherence of the carbon black to the inner walls of the scoop assemblies 20, rappers 24 are provided. Rappers are disclosed in the above-mentioned Patent 2,883,274. Such a rapper suitable for use in this invention is illustrated in FIGURE 3 in which it comprises a rectangular tube 41 having closed ends and in which a heavy weight or slide 42 is provided. The rapper can be attached by its side or by its end to the apparatus intended to be kept free of adhering carbon black. As illustrated in FIGURE 3, flanges 43 are provided at the end of tube 41 for attaching the rapper to the scoop assemblies 20. The walls of the scoop 25 are the first portion of the scoop assembly to contact carbon black, that is, the place most likely for adherence of the black and, accordingly, rapper 24 is attached to the scoop 25, as illustrated in FIGURE 2. Upon rotation of the mill in a clockwise direction from the position illustrated in FIGURE 2, the heavy slide or weight 42 falls downward against the scoop 25 thereby jarring or knocking loose from the scoop any adhering carbon black. Then, as a scoop assembly travels upward, the heavy slide falls in the opposite direction and, hitting the closed end of the shell, again causes a jarring or knocking of the scoop 25. In this manner the walls of the scoop assemblies 20 are maintained free of adhering carbon black.

As illustrated in FIGURE 3, a rapper 23 is attached rigidly to chute 22 to maintain this member free from adhering carbon black. Rapper 23 operates in the same manner as explained relative to rapper 24.

The drain dipper assembly 21, illustrated in FIGURES 2 and 4, is provided with means for regulating the position of the dipper relative to the bed of carbon black in the mill. Details of this drain dipper assembly are illustrated in FIGURE 4 and this assembly involves a plate 31 having a side wall 32 which also may be termed a guide wall or rim. The plate 31 is shaped as illustrated in FIGURE 4 and the guide wall 32 is affixed thereto so that the pellets picked up by the dipper will slide downward across plate 31 and be directed out of the mill by the guide rim 32 as the mill rotates. This guide rim 32 also directs the flow of pellets out of the mill so that they do not fall on the feed tube 13. The dipper 48 is composed of a bottom plate 49 around a portion of which is a side wall 50. The bottom plate 49 and the side wall 50 are rigidly attached to a shaft 29 which extends through the end wall 27 of the mill and through the guide rim 32. Thus, guide rim 32 and end wall 27 provide bearings for the shaft 29. A handle 28 is attached to the end of the shaft 29 outside of end wall 27 in such a manner that, upon rotation of the handle, the dipper 48 can be rotated anticlockwise, as illustrated in FIGURE 1, to such an extent that the dipper 48 nearly touches the inner periphery of the mill. With the dipper 48 in this position, upon rotation of the mill the dipper removes pellets near the surface of the mill as well as pellets from the top of the bed. Thus, with this dipper so positioned, upon continued rotation of the mill all or substantially all of the pellet bed is removed from the mill. During normal operation of the pellet mill, when it is not desired to remove all of the pellet bed, the handle 28 is rotated in a clockwise direction with the result that the scoop 48 (broken lines) acquires the position illustrated in FIGURE 2 with respect to chute 51. If ever it is desired to remove pellets from the top of the bed more rapidly than can be removed with use of the two dipper assemblies 20, the drain dipper 48 can be adjusted by proper rotation of handle 28 also to remove pellets from only the top of the bed. If desired, a rapper similar to rapper 24 can be attached to wall 32 or to plate 31 of the chute 51 so that slide 42 slides from one end of shell 41 to the other thereby jarring loose any adhering carbon black.

In the operation of a pelleting mill with discharge scoops according to this invention, the scoops were provided in a mill of 8 feet diameter by 48 feet in length. The mill was operated at 15.8 r.p.m. and the damper-type divider 33 was regulated to give a recycle ratio of pellets to feed of 2:1 by weight. Flocculent carbon black was fed to the mill at the rate of approximately 25,000 pounds per day. The depth of bed in the mill at the point at which scoop assemblies 20 dip into the pellet bed was maintained at approximately 18 inches. The carbon black pellets produced under these operating conditions weighed approximately 24 pounds per cubic foot.

A drain dipper 21 or some means for unloading the mill is necessary in order to open the mill for maintenance. Previously it was necessary to enter the mill and replace a regular product discharge scoop with a longer scoop or to open access doors and dump the mill contents on the ground. With the improved drain dipper it is only necessary to stop the mill, adjust the pickup scoop by rotating handle 28, regulate damper-type divider so there will not be any recycle, and then start the mill which will be emptied into regular conveying facilities.

While the above example illustrates satisfactory operation of the carbon black pellet mill as herein disclosed, it is realized that the operating conditions can be varied at least somewhat and yet produce a satisfactory type of pellets. Furthermore, pellet mills of different diameters and different lengths will, of course, require at least somewhat different operating conditions. However, those skilled in the art can quickly determine satisfactory operating conditions for any given size of mill.

I have shown herein two product dippers 20 but, as will be realized by those skilled in the art, a single product, or three product dippers can be used depending on the rate at which product is to be removed from the mill.

While I prefer to use a type of mechanical rapper, such as that herein disclosed, it will be realized that under some conditions satisfactory results can be achieved without employing any rappers.

While certain embodiments of the invention have been described for illustrative purposes, the invention obviously is not limited thereto.

That which is claimed is:

1. An apparatus for pelleting carbon black comprising, in combination, a horizontally disposed, elongated, hollow, cylindrical drum having end walls, one end of said drum being the inlet end and the other being the outlet end as regards direction of carbon black passage therethrough, means for rotating said drum, means for introducing carbon black to be pelleted into the inlet end of said drum, means for returning carbon black pellets from the outlet end to the inlet end of said drum, the inlet end wall and the outlet end wall of said drum having centrally and separately positioned openings, a tubular member positioned along the axis of said drum and extending through said openings, a scoop assembly supported by the inner surface of the outlet end wall, a chute operatively attached to said scoop assembly at one end and the other end extending through said opening in said outlet end wall, a projection of the axis of said chute parallel to the plane of said outlet end wall lying on a chord between two points of a circle around the inner wall of said mill, and said chord excluding said tubular member, said scoop assembly and chute being so oriented as regards direction of rotation of said mill that upon rotation of said mill carbon black pellets enter the scoop, pass along said chute to a point exterior of the outlet end of the mill, and drop from said chute free from contact with said tubular member.

2. An apparatus for pelleting carbon black comprising, in combination, a horizontally disposed, elongated, hollow, cylindrical drum having end walls, one end of said drum being the inlet end and the other being the outlet end as regards direction of carbon black passage therethrough, means for rotating said drum, means for introducing carbon black to be pelleted into the inlet end of said drum, the inlet end wall and the outlet end wall of said drum having centrally and separately positioned openings, a tubular member positioned along the axis of said drum and extending through said openings, a scoop assembly supported by the inner surface of the outlet end wall, a chute operatively attached to said scoop assembly at one end and the other end extending through said opening in said outlet end wall, a projection of the axis of said chute parallel to the plane of said outlet end wall lying on a chord between two points of a circle around the inner wall of said mill, and said chord excluding said tubular member, said scoop assembly and chute being so oriented as regards direction of rotation of said mill that upon rotation of said mill carbon black pellets enter the scoop, pass along said chute to a point exterior of the outlet end of the mill, and drop from said chute free from contact with said tubular member.

3. An apparatus for pelleting carbon black comprising, in combination, a horizontally disposed, elongated, hollow, cylindrical drum having end walls, one end of said drum being the inlet end and the other being the outlet end as regards direction of carbon black passage therethrough, means for rotating said drum, means for introducing carbon black to be pelleted into the inlet end of said drum, the inlet end wall and the outlet end wall of said drum having centrally and separately positioned openings, a tubular member positioned along the axis of said drum and extending through said openings, a scoop supported adjacent the inner surface of said outlet end wall, a chute operatively communicating with said scoop and extending through said opening in such a manner as to discharge carbon black from said scoop to a point exterior of said mill, a projection of the axis of said chute parallel to the plane of said outlet end wall lying on a nondiametric chord between two points of a circle around the outlet end wall of said mill, said chord excluding the tubular member, said scoop and chute being so oriented as regards direction of rotation of said mill that upon rotation thereof carbon black pellets enter the scoop, pass along said chute to a point exterior of the outlet end of said mill, and drop from said chute free from contact with said tubular member.

4. An apparatus for pelleting carbon black comprising, in combination, a horizontally disposed, elongated, hollow, cylindrical drum having end walls, one end of said drum being the inlet end and the other end being the outlet end as regards direction of carbon black passage therethrough, means for rotating said drum, means for introducing carbon black to be pelleted into the inlet end of said drum, the inlet end wall and the outlet end wall of said drum having centrally and separately positioned openings, an angle iron supported adjacent the inner surface of the outlet end wall, a tubular member positioned along the axis of said drum and extending through said openings, a scoop supported by said angle iron, the longitudinal axis of said scoop being parallel to the axis of said angle iron, and said scoop being adjustably fixed to said angle iron, a chute operatively attached to said scoop at one end and the other end extending through said opening in the outlet end wall in such a manner as to discharge carbon black from said scoop to a point exterior of said mill, a projection of the axis of said chute parallel to the plane of said outlet end wall lying on a nondiametric chord between two points of a circle around the outlet end wall of said mill, said chord excluding the tubular member, said scoop and chute being so oriented as regards direction of rotation of said mill that upon rotation thereof carbon black pellets enter the scoop, pass along said chute to a point exterior of the outlet end of said mill, and drop from said chute free from contact with said tubular member.

5. The apparatus of claim 1 wherein said scoop assembly comprises a scoop fixed to a shaft, the axis of said shaft being parallel to the axis of said mill, one end of said shaft extending through said outlet end wall and means at said one end of said shaft for rotating same around its axis.

6. The apparatus of claim 5 wherein said scoop is elongated along an axis normal to the axis of said shaft wherein upon rotation of said means at one end of said shaft for rotating same said scoop rotates and the end thereof remote from said shaft is positioned against the inner wall of said mill whereby upon rotation of said mill the mill is drained of pellets.

References Cited in the file of this patent

UNITED STATES PATENTS

| | | |
|---|---|---|
| 1,651,390 | Hersman | Dec. 6, 1927 |
| 2,711,557 | Russell | June 28, 1955 |
| 2,834,044 | Antonsen et al. | May 13, 1958 |
| 2,872,300 | Pollock | Feb. 3, 1959 |
| 2,883,274 | Ceresna | Apr. 21, 1959 |